US012171273B2

(12) United States Patent
Testoni et al.

(10) Patent No.: US 12,171,273 B2
(45) Date of Patent: Dec. 24, 2024

(54) SYSTEM FOR ASSEMBLING AND FILLING ELECTRONIC CIGARETTES

(71) Applicant: G.D S.p.A., Bologna (IT)

(72) Inventors: Luca Testoni, Castel Maggiore (IT); Luca Lanzarini, Crespellano (IT); Massimo Sartoni, Bologna (IT); Luca Federici, Bologna (IT)

(73) Assignee: G.D S.P.A., Bologna (IT)

( * ) Notice: Subject to any disclaimer, the term of this patent is extended or adjusted under 35 U.S.C. 154(b) by 740 days.

(21) Appl. No.: 16/617,999

(22) PCT Filed: Jun. 27, 2018

(86) PCT No.: PCT/IB2018/054737
§ 371 (c)(1),
(2) Date: Nov. 27, 2019

(87) PCT Pub. No.: WO2019/003127
PCT Pub. Date: Jan. 3, 2019

(65) Prior Publication Data
US 2020/0107580 A1    Apr. 9, 2020

(30) Foreign Application Priority Data
Jun. 29, 2017 (IT) .................. 102017000072715

(51) Int. Cl.
*A24F 40/70*    (2020.01)
*A24F 40/10*    (2020.01)
(Continued)

(52) U.S. Cl.
CPC .............. *A24F 40/70* (2020.01); *A24F 40/10* (2020.01); *B65B 1/04* (2013.01); *B65B 1/32* (2013.01);
(Continued)

(58) Field of Classification Search
CPC ......... A24F 40/00; A24F 40/70; B65G 15/00; B65G 15/42; B65B 1/30; B65B 1/32; B65B 43/32; B65B 43/60
See application file for complete search history.

(56) References Cited

U.S. PATENT DOCUMENTS 3,770,100 A * 11/1973 McCaul ............... B65G 17/005
198/890.1
5,064,054 A * 11/1991 Hoppmann ............ B65G 15/28
198/779
(Continued)

FOREIGN PATENT DOCUMENTS

CA        2956085 A1    1/2016
WO     2015101862 A1    7/2015
(Continued)

OTHER PUBLICATIONS

International Search Report and Written Opinion dated Dec. 20, 2018 for counterpart International Patent Application No. PCT/IB2018/054737.
(Continued)

*Primary Examiner* — Thomas M Wittenschlaeger
*Assistant Examiner* — David G Shutty
(74) *Attorney, Agent, or Firm* — SHUTTLEWORTH & INGERSOLL, PLC; Timothy J. Klima

(57) ABSTRACT

A system for assembling electronic cigarette parts comprising cartridges and for filling the cartridges includes a first conveyor; a first group of carrier units connected to the first conveyor to be movable independently along the first conveyor and to receive and hold the parts; a first group of working stations for assembling/inspecting the cigarette parts on the first conveyor; a second conveyor, downstream of the first conveyor; and a second group of carrier units connected to the second conveyor to be movable independently along the second conveyor and to receive and hold the
(Continued)

parts; a second group of working stations for assembling/inspecting the parts on the second conveyor; and a filling station, disposed between the first and second conveyors to receive the parts from the first conveyor, fill the respective cartridges, and feed the parts with the filled cartridges towards the second conveyor.

8 Claims, 10 Drawing Sheets

(51) Int. Cl.
  *B65B 1/04* (2006.01)
  *B65B 1/32* (2006.01)
  *B65B 43/52* (2006.01)
  *B65B 43/60* (2006.01)
  *B65G 37/00* (2006.01)

(52) U.S. Cl.
  CPC .............. *B65B 43/52* (2013.01); *B65B 43/60* (2013.01); *B65G 37/00* (2013.01); *B65G 2201/0261* (2013.01)

(56) References Cited

U.S. PATENT DOCUMENTS

| | | | |
|---|---|---|---|
| 7,937,907 B2 * | 5/2011 | Fleckenstein | ........... B65B 65/00 53/287 |
| 2018/0170588 A1 * | 6/2018 | Boldrini | .................. A24F 40/70 |

FOREIGN PATENT DOCUMENTS

| | | |
|---|---|---|
| WO | 2015140768 A2 | 9/2015 |
| WO | 2016200259 A1 | 12/2016 |

OTHER PUBLICATIONS

European Office Action dated May 7, 2021 for counterpart European Patent Application No. 18747006.7.

* cited by examiner

SYSTEM FOR ASSEMBLING AND FILLING ELECTRONIC CIGARETTES

This application is the National Phase of International Application PCT/IB2018/054737 filed Jun. 27, 2018 which designated the U.S.

This application claims priority to Italian Patent Application No. 102017000072715 filed Jun. 29, 2017, which application is incorporated by reference herein.

TECHNICAL FIELD

This invention addresses the technical field of electronic cigarettes.

More specifically, the invention relates to a system for assembling and filling electronic cigarettes.

BACKGROUND ART

As is known, electronic cigarettes are made up of different components which are assembled to each other.

In recent times, the production of electronic cigarettes has become more and more automated; in particular, automatic stations are dedicated to operations which differ greatly from each other: for example, assembling the electronic components, filling the cartridges with the liquid to be vaporized, inspecting the assembled groups, etc.

The degree of precision required for one operation may be very different from that required for other operations and managing them all may be very complex.

Some operations, such as filling the cartridges, for example, may indeed be very simple and do not require particularly high levels of precision. Other operations, such as assembling, on the other hand, are clearly more complex and require very high levels of precision.

In many cases, therefore, two or more systems placed in parallel are necessary to perform different operations at different times. As a result, assembling and filling electronic cigarettes require considerable lengths of time and the overall dimensions of the systems used for these purposes are very often also considerable.

DISCLOSURE OF THE INVENTION

The aim of this invention is to overcome the above mentioned drawbacks. This aim is achieved by proposing a system for assembling and filling electronic cigarettes according to the accompanying claims.

Advantageously, this invention allows increasing overall productivity not only because it allows assembling and filling two groups of electronic cigarettes simultaneously but also because it offers a high level of flexibility.

BRIEF DESCRIPTION OF THE DRAWINGS

Further advantages are more apparent in the specification which follows, with reference to the accompanying drawings, in which.

DETAILED DESCRIPTION OF PREFERRED EMBODIMENTS OF THE INVENTION

Figure 1:
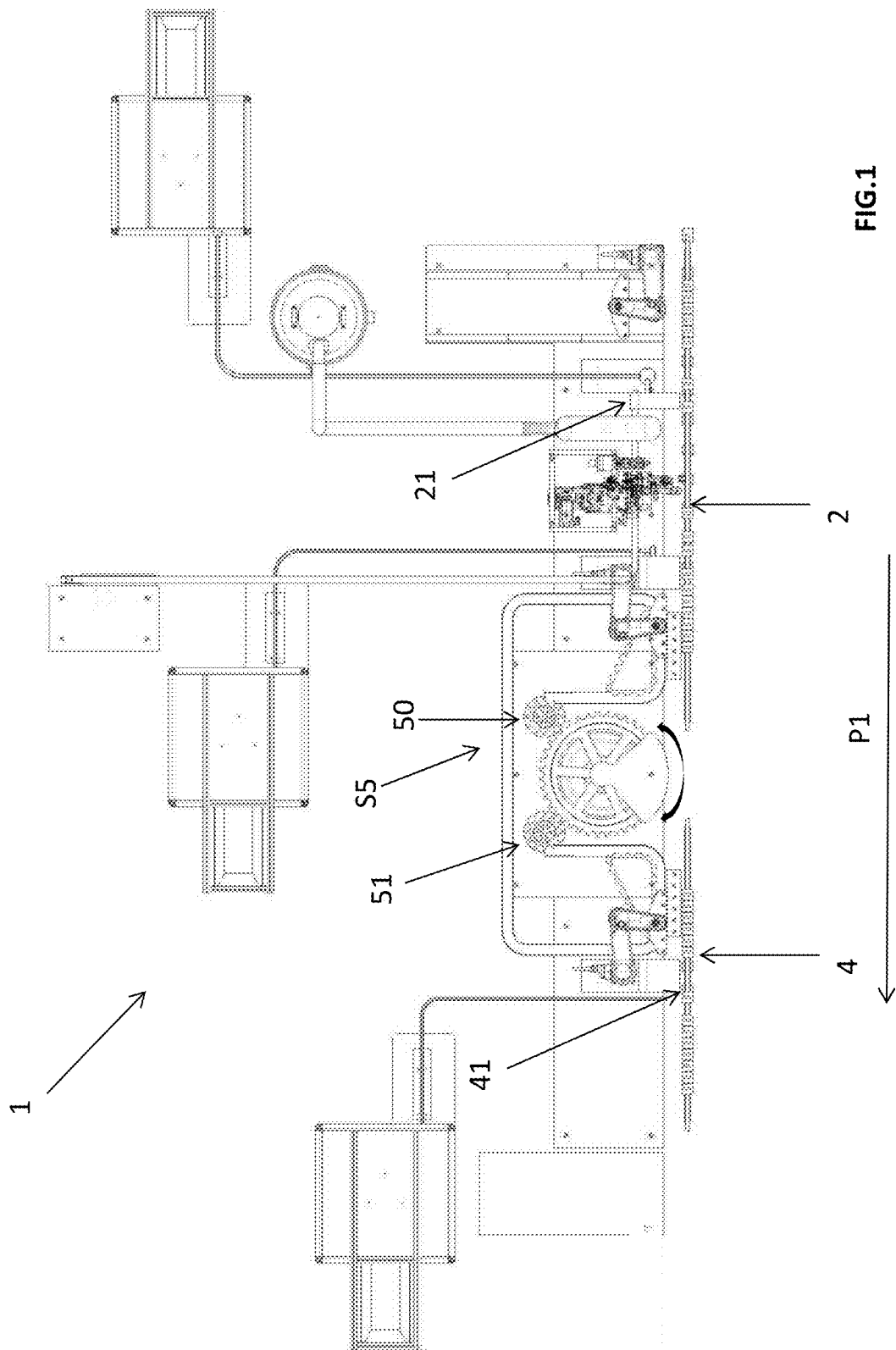
FIG. 1 is a schematic plan view of a system according to the invention, in a first embodiment of it.

With reference to the accompanying drawings, the numeral 1 denotes a system according to this invention, for assembling and filling electronic cigarette parts comprising cartridges.

The expression "electronic cigarette parts" is used to mean complete electronic cigarettes or components of electronic cigarettes, in both cases comprising cartridges (which need to be filled).

The system 1 for assembling electronic cigarette parts comprising cartridges and for filling the cartridges comprises a first, endless linear motor conveyor 2; a first group of carrier units 20 connected to the first conveyor 2 in order to be movable along the first conveyor 2 independently of one another. Each working unit of the first group of carrier units 20 is configured to receive and hold electronic cigarette parts.

The system 1 also comprises a first group of working stations 21 for assembling and/or inspecting the electronic cigarette parts conveyed along the first conveyor 2 and held by the first group of carrier units 20.

The system 1 also comprises a second, endless linear motor conveyor 4, downstream of the first conveyor 2; and a second group of carrier units 40 connected to the second conveyor 4 in order to be movable along the second conveyor 4 independently of one another. Each carrier unit of the second group of carrier units 40 is configured to receive and hold electronic cigarette parts.

The system 1 also comprises a second group of working stations 41 for assembling and/or inspecting the electronic cigarette parts conveyed along the second conveyor 4; and held by the second group of carrier units 40.

The system 1 further comprises a filling station S5 which is interposed between the first conveyor 2 and the second conveyor 4 and which is configured to receive the electronic cigarette parts at a loading zone 50 from the first conveyor 2, to fill the respective cartridges, and, at an unloading zone 51, to feed the electronic cigarette parts with the respective filled cartridges towards the second conveyor 4.

Advantageously, thanks to the system 1, it is possible to sequentially perform a series of operations which require different degrees of precision, even very different from each other. Specifically, the first group of working stations 21 and the second group of working stations 41 perform assembly/inspection operations on the electronic cigarette parts: these operations are often complicate and require a high level of precision (because they involve manipulating/assembling very small parts/components).

The cartridges, on the other hand, are filled by the filling station S5, which is interposed between the first conveyor 2 and the second conveyor 4: this operation is much simpler than the assembling/inspection operations and, compared to these, require a lower level of precision.

The above mentioned operations, with such different technical and management requirements, are perfectly integrated in the system 1. This reduces production times compared to parallel systems, where the electronic cigarettes must be transferred from/to the assembling stations to/from the filling station. Furthermore, the overall dimensions of the system 1 are particularly limited.

In the accompanying drawings, the first group of working stations 21 and the second group of working stations 41 (represented schematically and by way of example) are located at the upper section of the first conveyor 2 and of the second conveyor 4, respectively. In a variant not illustrated, there may be other working stations—inspection stations, for example—at the bottom section of the first conveyor 2 and/or of the second conveyor 4. That way, the overall dimensions can be even further reduced.

The first group of carrier units 20 and the second group of carrier units 40 have magnets (not shown) mounted on them to allow movement along the first conveyor 2 and along the second conveyor 4.

In the preferred embodiment illustrated in FIGS. 1-5, the system 1 further comprises a first weighing station S1 (illustrated schematically), disposed upstream of the loading zone 50 of the filling station S5 to allow weighing the electronic cigarette parts conveyed by the first conveyor 2, before the cartridges are filled; and a second weighing a station S2 (illustrated schematically), disposed downstream of the unloading zone 51 of the filling station S5 to allow weighing the electronic cigarette parts leaving the filling station S5, after the cartridges have been filled and before transfer to the second conveyor 4.

It is thus advantageously possible to control the quantity of product filled into the cartridges (which may be a liquid or a powder). For this purpose, the system 1 may comprise a processing unit (not illustrated) capable of calculating the difference, for each cartridge, between the weight measured at the first weighing station S1 and the weight measured at the second weighing station S2. The processing unit is also capable of comparing the quantity of product filled into each cartridge with a reference value. If the value measured does not coincide with the reference value, the processing unit flags the cartridge as "non-conforming" and causes it to rejected at a dedicated station (not illustrated).

In an alternative embodiment, not illustrated, the quantity of product filled into each cartridge is measured at a single measuring station located downstream of the unloading zone of the filling station, which involves, for example, a volumetric or pressure measurement of each cartridge (using measuring methods not described in this specification). In the same way as what is described above, a processing unit is provided in this case, too, which is capable of comparing the quantity of product filled into each cartridge with a reference value, causing the cartridge to be rejected if it is found to be "non-conforming".

With reference in particular to the embodiments illustrated in FIGS. 1-5 and 8-9, the filling station S5 comprises housings 6 positioned along a circular path 10 and rotatable in a first rotation direction W about the axis of the circular path 10 to receive and hold the electronic cigarette parts; and a plurality of filling heads 7 for filling the cartridges of the electronic cigarette parts when disposed at the housings 6.

In the embodiment of the invention illustrated in FIGS. 4, 5, 8, 9, the filling heads 7 are mounted to a carousel having a circular profile, positioned above the housings 6 and rotatable about its axis in the first rotation direction W simultaneously with the housings 6.

The axis of rotation of the carousel is preferably parallel to, and still more preferably, coincident with, the axis of rotation of the circular profile 10 defined by the housings 6.

According to the embodiment just described, the number of filling heads 7 is equal to the number of housings 6 which receive the electronic cigarette parts (comprising the cartridges).

In this embodiment, therefore, the filling station S5 is a horizontally oriented carousel which rotates continuously about the respective vertical axis. For example, the first group of filling heads 7 is also movable axially between an idle position and an operating position, where the operating position is axially below the idle position and where the electronic cigarette parts are filled.

Figure 2:
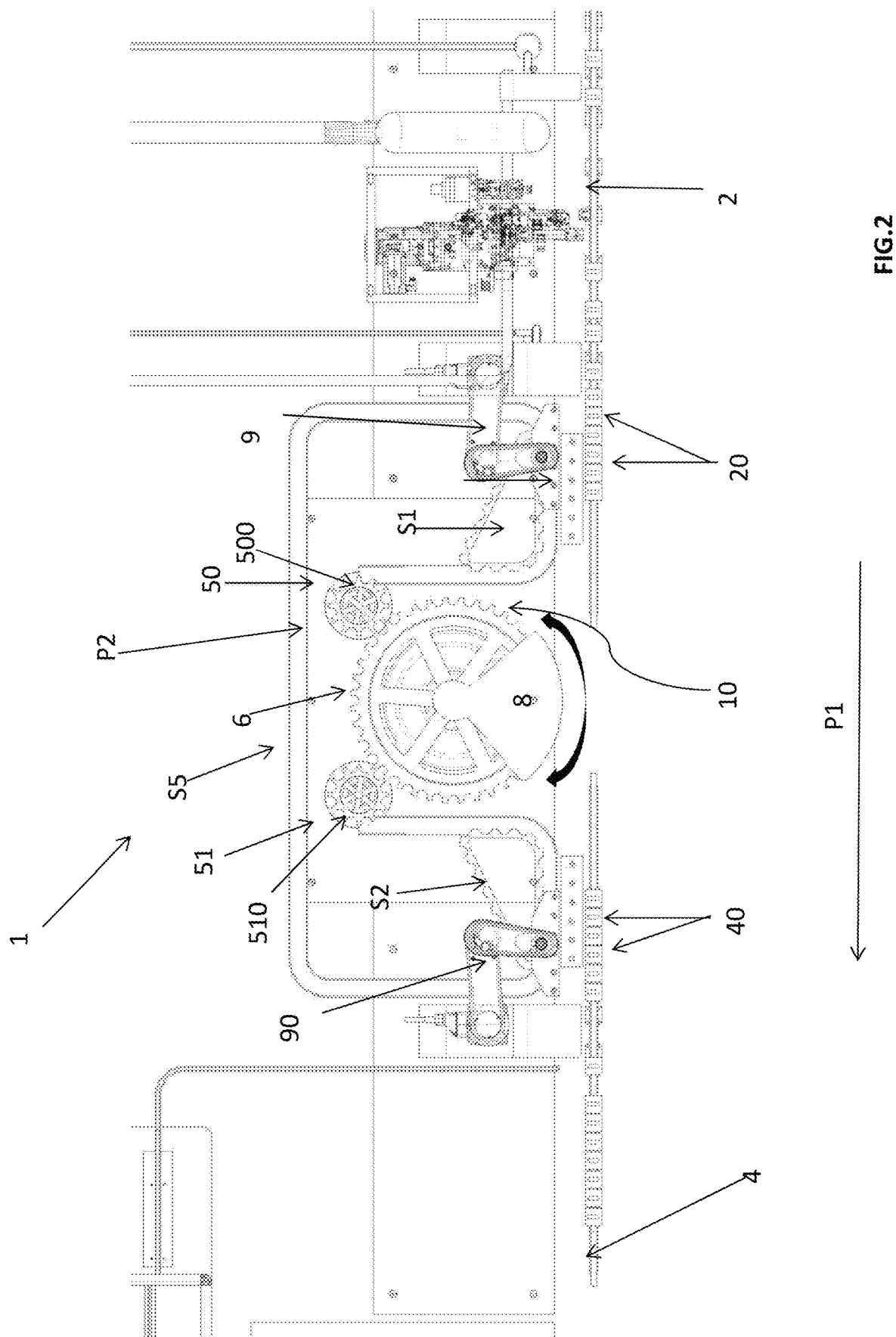
FIG. 2 is an enlarged view of the system of FIG. 1.
Figure 3:
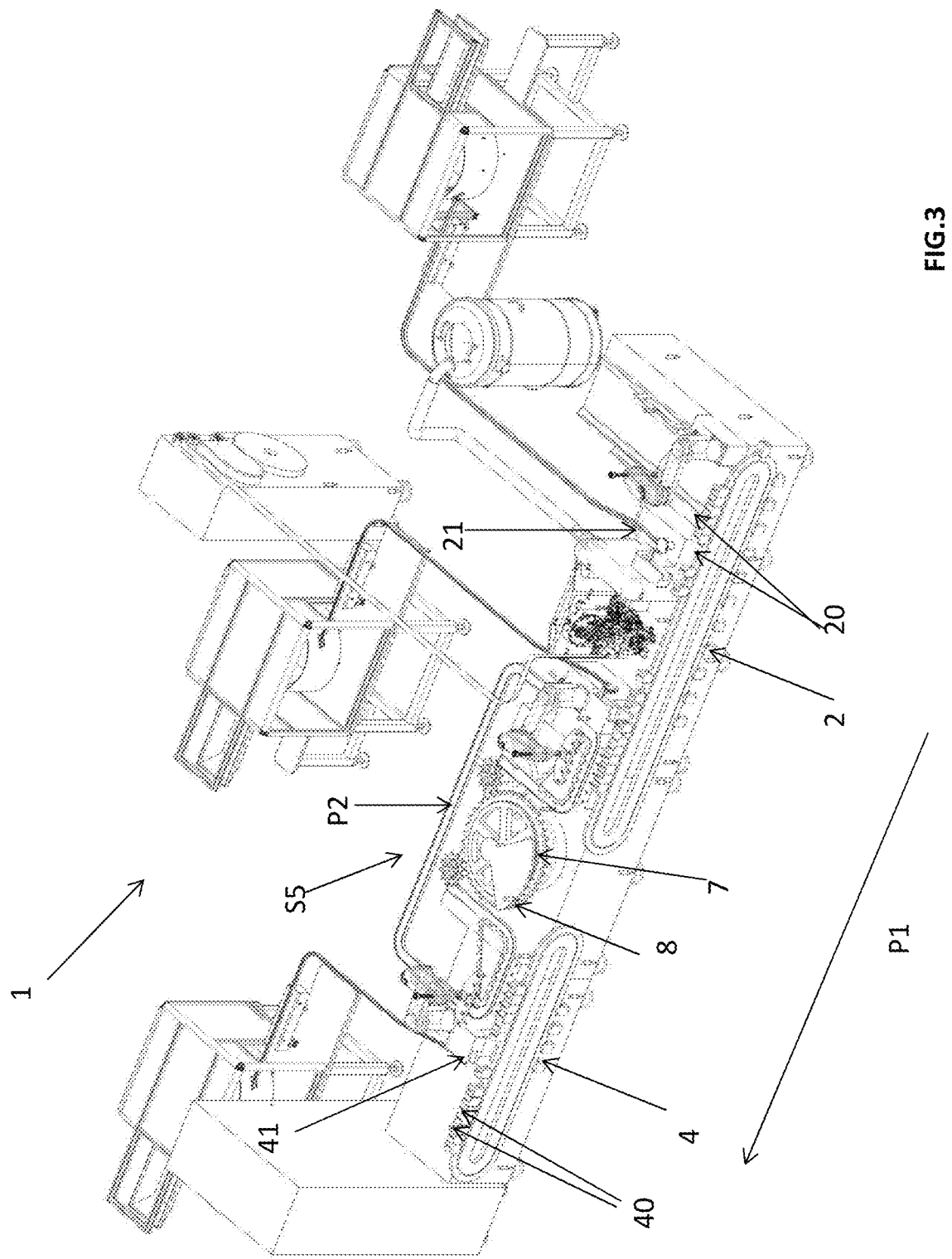
FIG. 3 is a perspective view of the system of FIG. 1.
Figure 4:
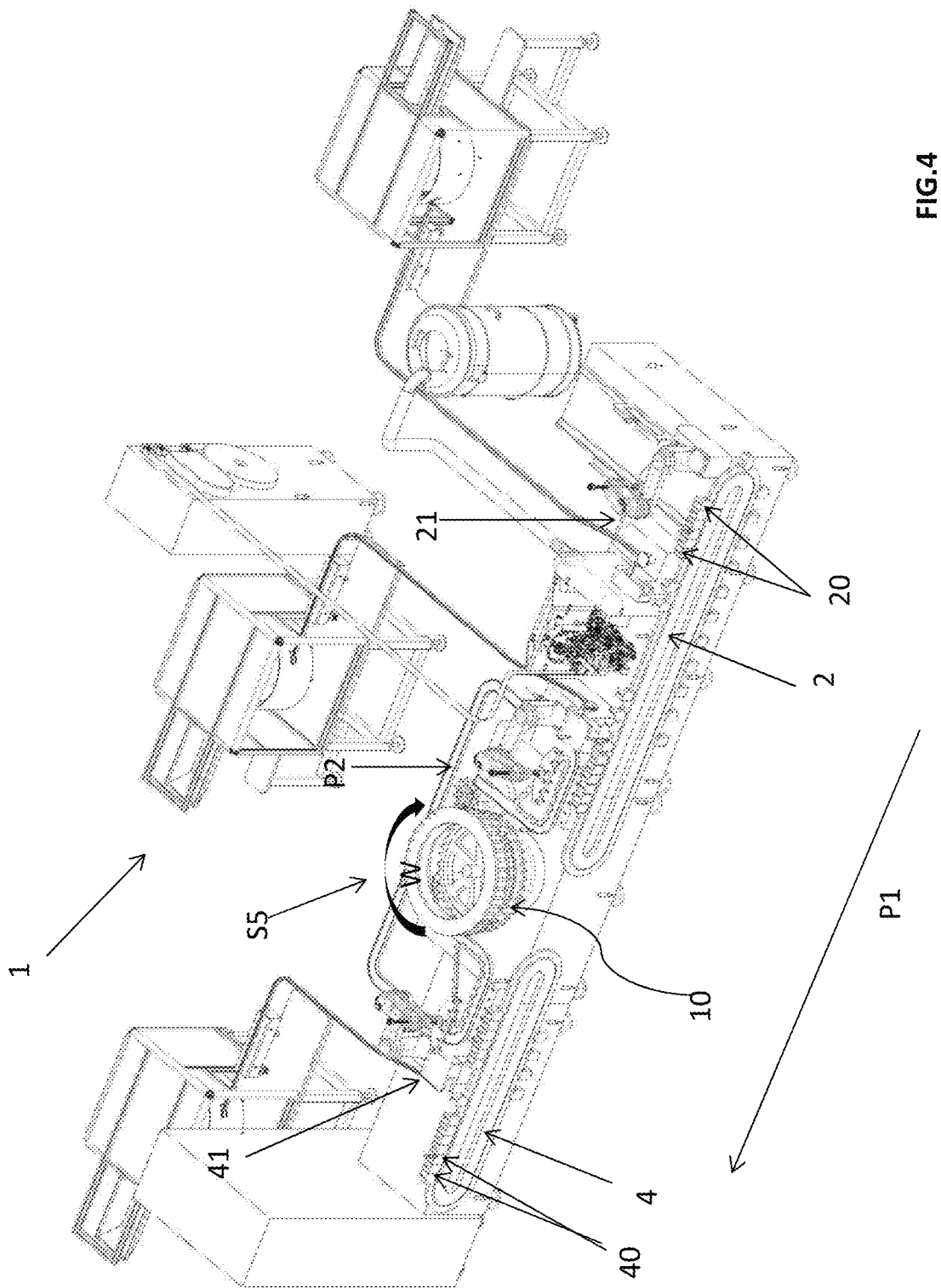
FIG. 4 is a schematic perspective view of a system according to the invention, in a second embodiment of it.
Figure 5:
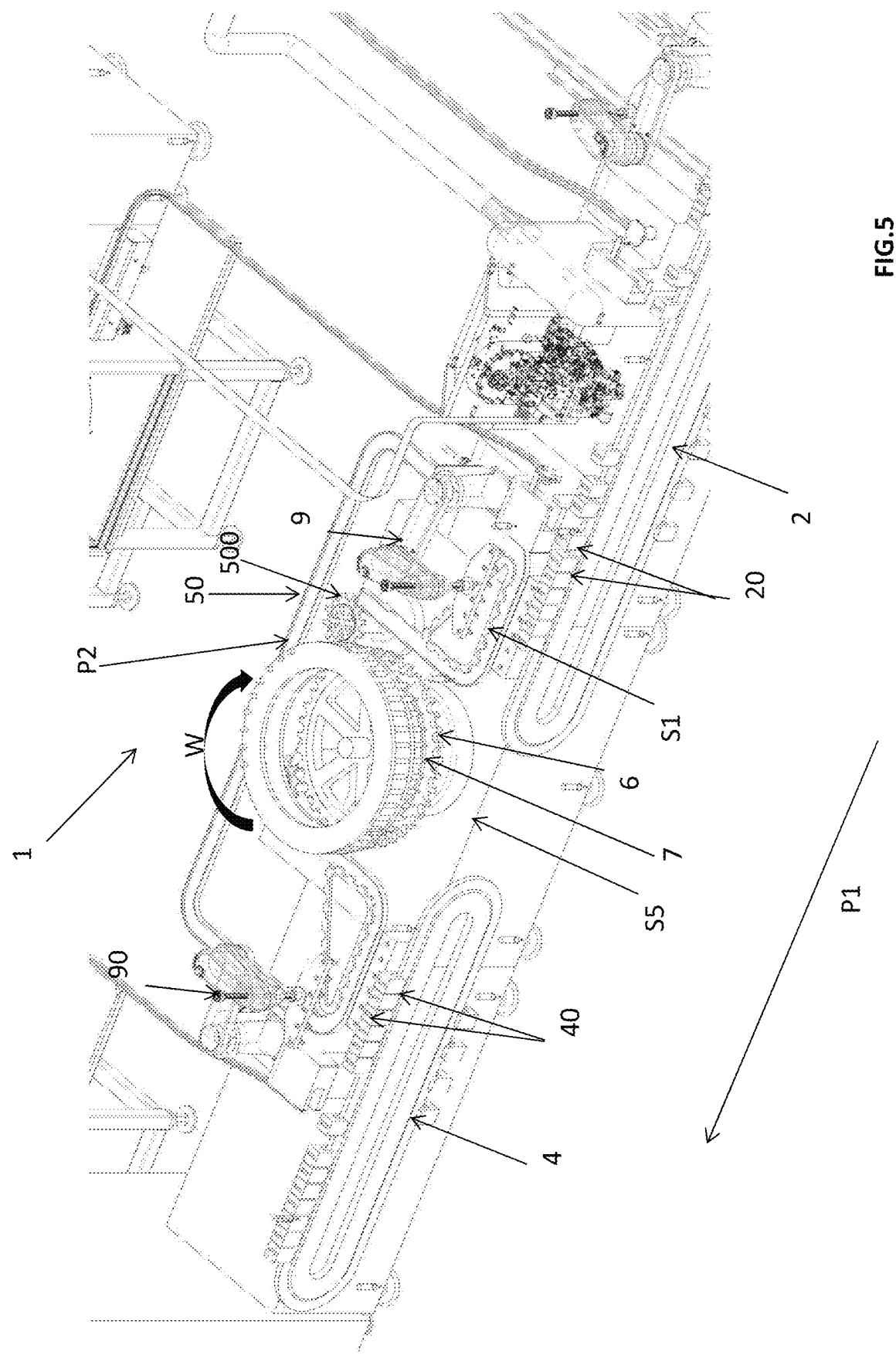
FIG. 5 is an enlarged view of FIG. 4.

In the embodiment illustrated in FIGS. 1-3, the filling heads 7 are mounted to a sector 8 that is rotatable about a rotation axis (which, in the drawings, is represented as a circular sector) in the first rotation direction W while the electronic cigarette parts are being filled, performing a forward stroke, and in a second rotation direction, opposite to the first rotation direction W, after the electronic cigarette parts have been filled, performing a backward stroke.

Again with reference to FIGS. 1-3, the axis of rotation of the sector 8 is a vertical axis. The axis of rotation is preferably parallel to, and still more preferably, coincident with, the axis of rotation of the circular profile 10 defined by the housings 6.

In this embodiment, unlike the embodiment described previously, the filling heads move with alternating rotary motion along respective forward strokes (during which they fill the cartridges) and return strokes (during which they are idle, that is to say, they do not fill the electronic cigarettes) (rotational following).

For example, the filling heads 7 are also movable axially between an idle position and an operating position, where the operating position is axially below the idle position and where the electronic cigarette parts are filled.

With reference to the two embodiments described above, there are provided at the loading zone 50 and at the unloading zone 51, corresponding transfer devices 500, 510—for example of the star wheel type—which transfer the electronic cigarette parts into the housings 6 and disengage them from the housings 6.

Figure 6:
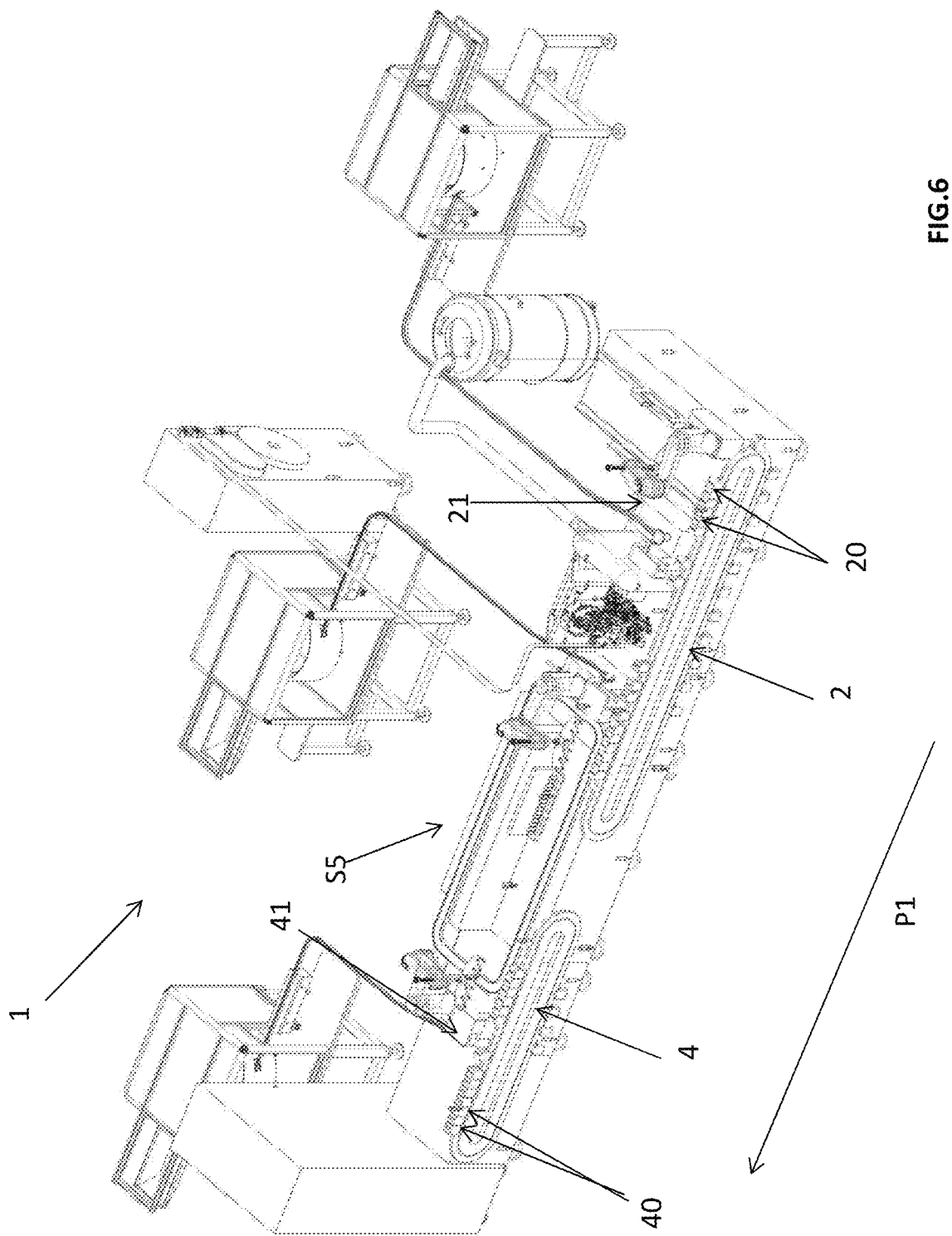
FIGS. 6 and 7 are two views like those of FIG. 4 and FIG. 5, respectively, according to a third embodiment of the invention.
Figure 7:
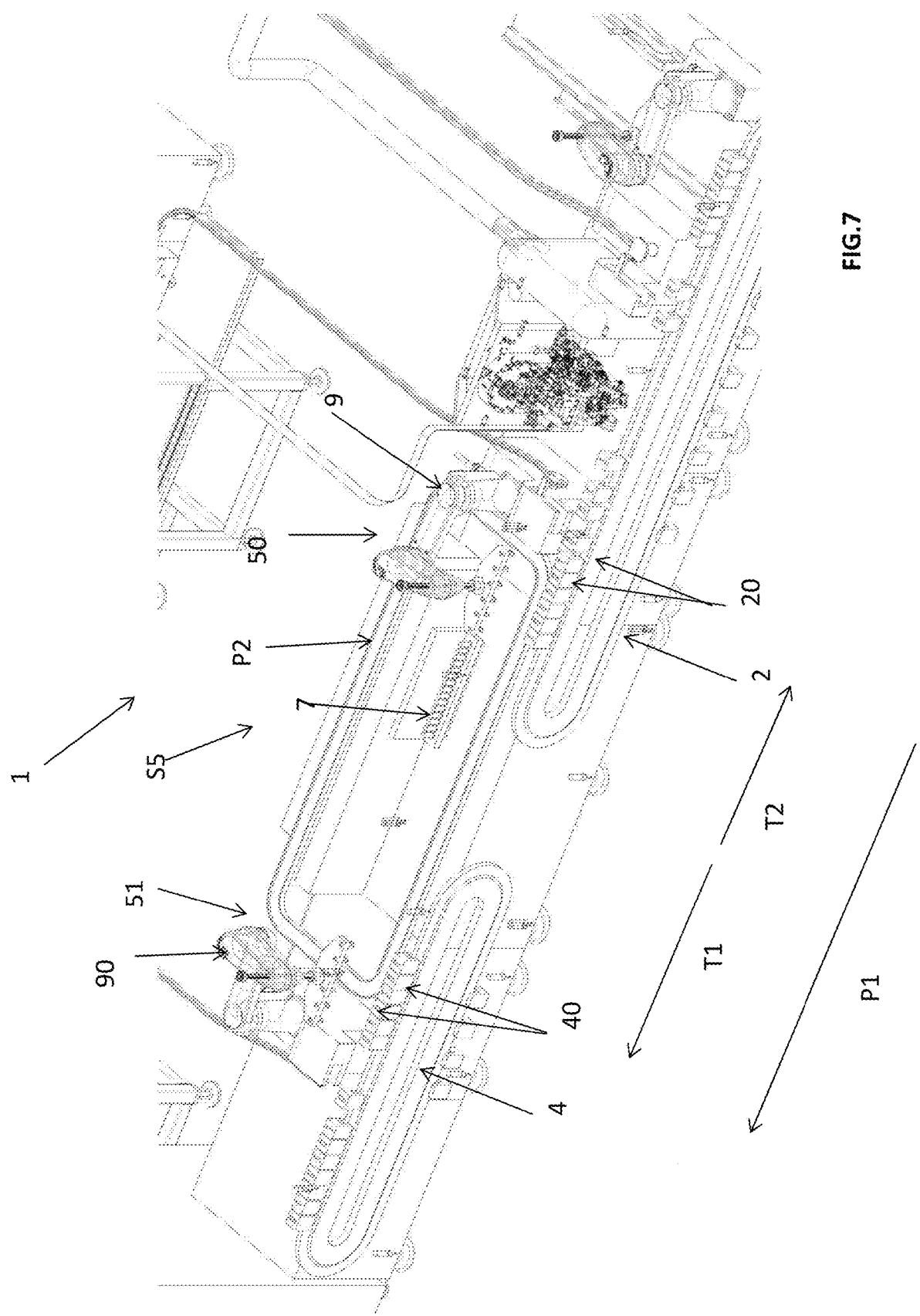

In the embodiment illustrated in FIGS. 6 and 7, the filling station S5 comprises a row of housings 6 (not visible in the accompanying drawings) to receive the electronic cigarette parts and movable translationally in first translation direction T1 and in a second translation direction T2, opposite to the first translation direction T1. The filling station S5 comprises a plurality of filling heads 7—for example, a row of filling heads 7—for filling the electronic cigarette parts and movable translationally in the first translation direction T1 and in the second translation direction T2, simultaneously with the housings 6 (linear following).

In this case, too, the filling heads 7 are also movable vertically between an idle position and an operating position, where the operating position is axially below the idle position and where the electronic cigarette parts (cartridges) are filled.

Preferably, the system 1 comprises a plurality of support containers (also known as buckets, not illustrated) for supporting the electronic cigarette parts while the cartridges are being filled in the filling station S5. Use of these support containers is necessary because the cigarette parts, and in particular, the cartridges to be filled, are of reduced size, and in some cases are fragile or have unstable positions which would make them difficult to fill.

The system 1 also comprises first pickup means 9 for picking up the electronic cigarette parts from the first group of carrier units 20 as they leave the first conveyor 2 and for placing them in the containers. The second embodiment of the system 1 also comprises second pickup means 90 for picking up the electronic cigarette parts from the containers as they leave the filling station S5, and placing them at the second group of carrier units 40 as they enter the second conveyor 4. As shown in the drawings, the first pickup means 9 and the second pickup means 90 comprise a plurality of robotized arms (also known as "pick and place arms").

With reference to the accompanying drawings, the system 1 further comprises an auxiliary path P2 connecting the unloading zone 51 with the loading zone 50 of the filling station S5, on the outside of the filling station S5. The support containers are conveyed along the auxiliary path P2 (which comprises a rail) after the electronic cigarette parts have been picked up from the containers.

The first pickup means 9 therefore pick up the electronic cigarette parts which have been conveyed along the first conveyor 2 (at an outfeed zone thereof) and place them in the containers on the first auxiliary path (before being placed in the containers, the electronic cigarette parts are, if necessary, weighed at the first weighing station S1, as described above). The support containers then move along one stretch of the auxiliary path P2 and reach the loading zone 50 of the filling station. The containers are held in the housings 6 of the filling station while the cartridges are filled. Next, once filling is over, the containers with the electronic cigarette parts inside them reach the unloading zone 51 and the second pickup means 90 pick up the electronic cigarette parts and place them at the second group of carrier units 40, that is, on the second conveyor 4 (at a respective infeed zone). At this point, the empty containers move along the auxiliary path P2 from the unloading zone 51 to the loading zone 50, where they are once again filled by the first pickup means 9.

By suitably setting up different working stations along the first and second conveyors 2 and 4 and the conveying/filling directions, it is, if necessary, possible to invert the feed direction of the electronic cigarette parts (that is, making them move from the second conveyor to the first conveyor). Thus, the system 1 is advantageously made even more flexible.

Figure 8:
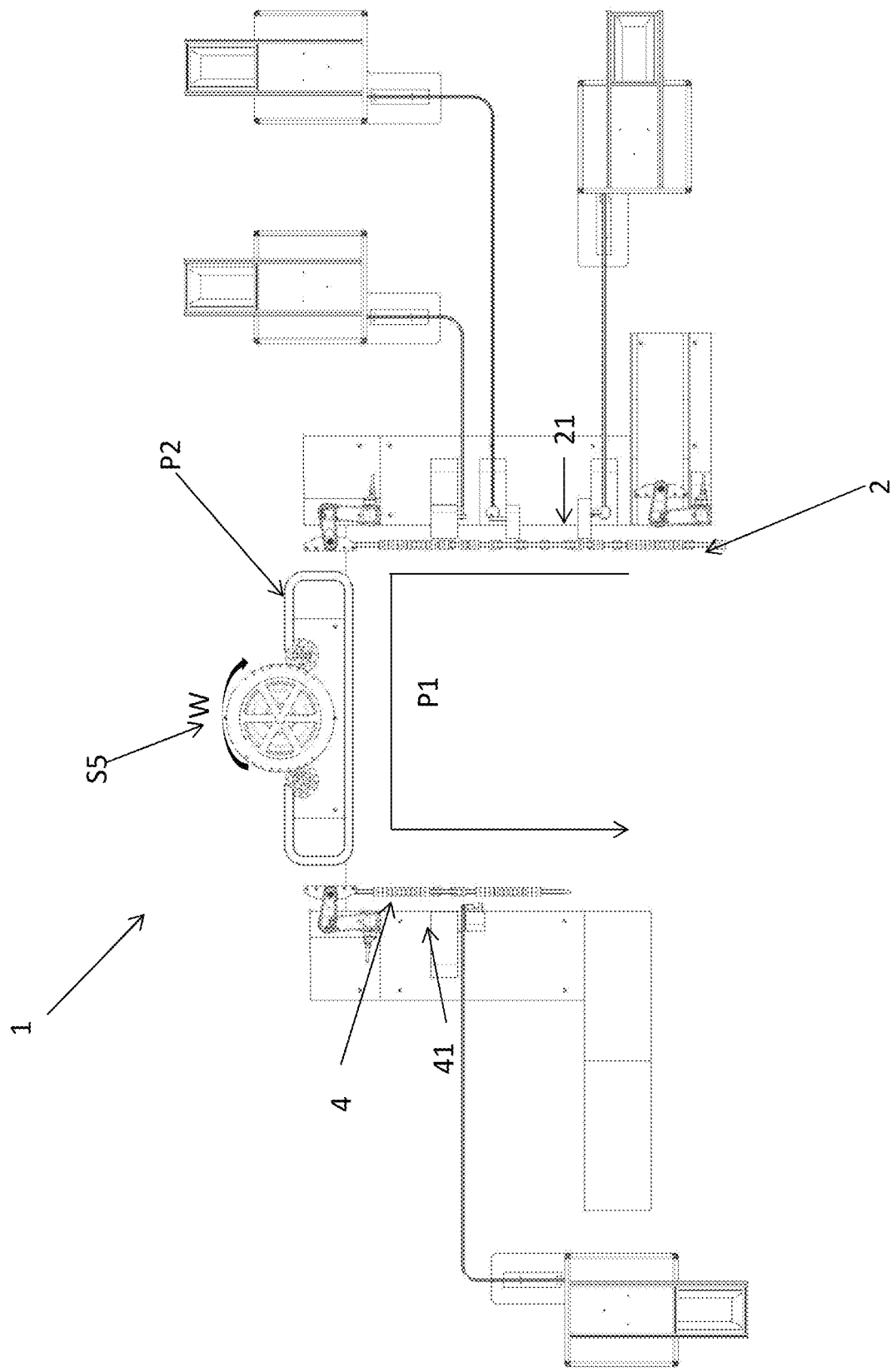
FIGS. 8 and 9 are, respectively, a schematic plan view and a schematic perspective view of the second embodiment of the system of the invention in a variant that differs from what is illustrated in FIG. 4 and FIG. 5.
Figure 9:
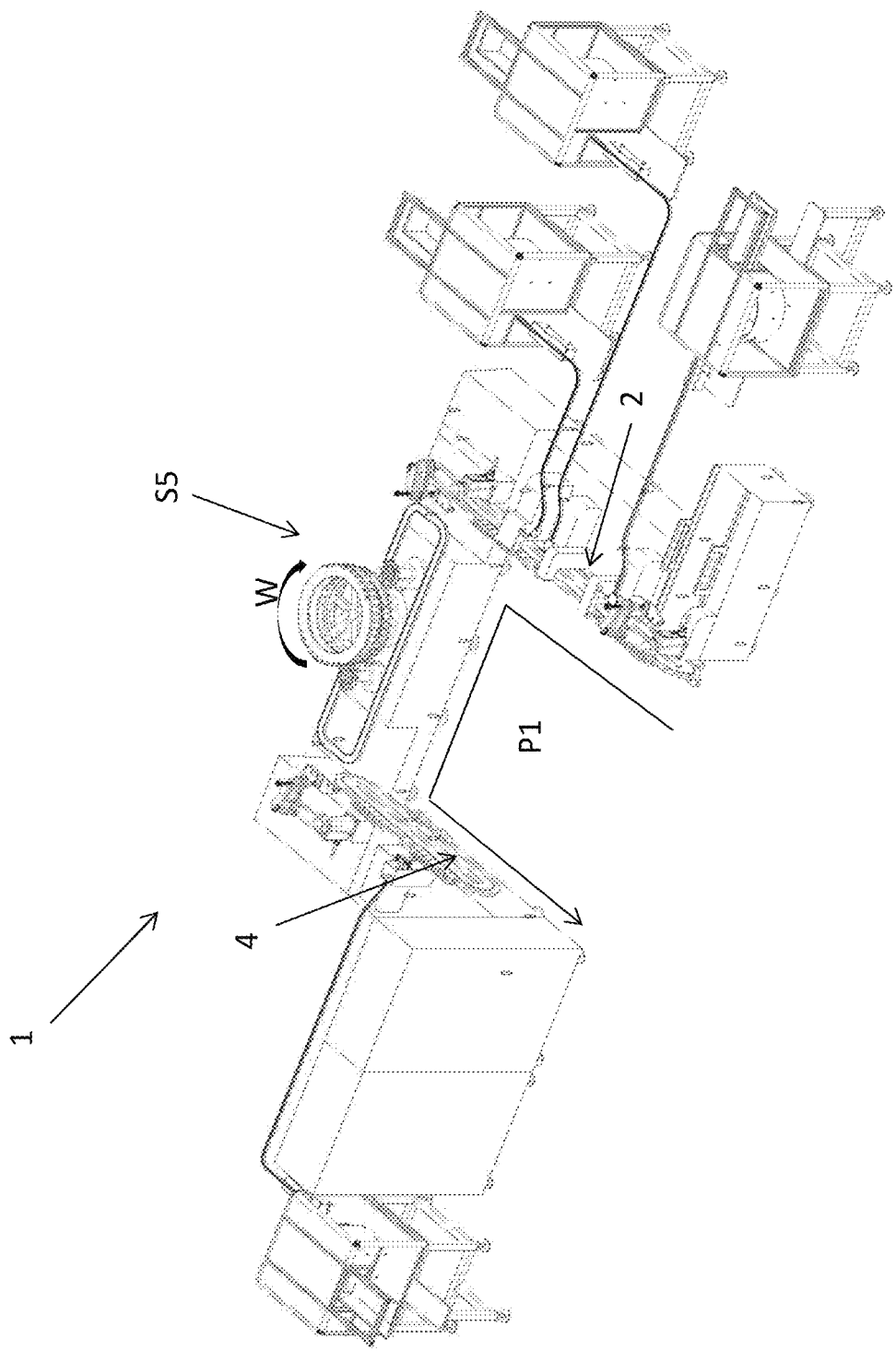
Figure 10:
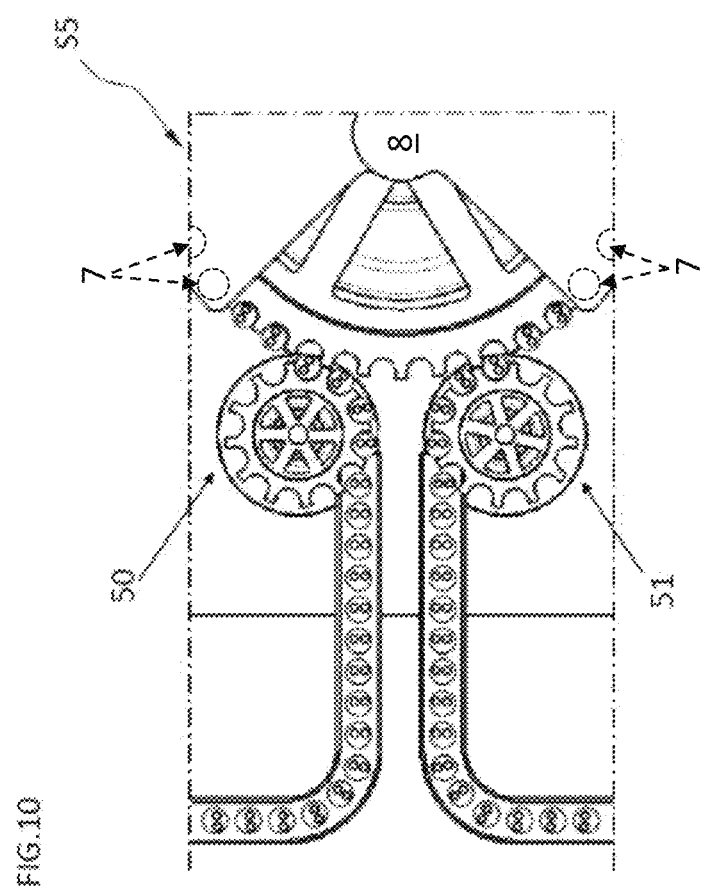
FIG. 10 is a detail view showing the containers.

As shown in FIGS. 8 and 9, the first conveyor, the filling station S5 and the second conveyor 4 are disposed in such a way that the electronic cigarette parts travel along a C-shaped path P1 passing through the system 1 itself.

Alternatively, as shown in FIGS. 1-7, the first conveyor, the filling station S5 and the second conveyor 4 are disposed in such a way that the electronic cigarette parts travel along an I-shaped path P1 passing through the system 1 itself.

Advantageously, the system 1 allows the layout to be configured according to the available space, making it particularly flexible and versatile.

By suitably setting up different working stations along the first and second conveyors 2 and 4 and the conveying/filling directions, it is, if necessary, possible to invert the feed direction of the electronic cigarette parts (that is, making them move from the second conveyor to the first conveyor). Thus, the system 1 is advantageously made even more flexible.

The invention claimed is:

1. A system for assembling electronic cigarette parts comprising cartridges and for filling said cartridges, the system comprising:
   an endless linear motor first conveyor; a first group of carrier units connected to the first conveyor to be movable independently of one another along the first conveyor; each carrier unit being configured to receive and hold the electronic cigarette parts;
   a first group of working stations for assembling and/or inspecting the electronic cigarette parts conveyed along the first conveyor and held by the first group of carrier units;
   an endless linear motor second conveyor, located downstream of the first conveyor; a second group of carrier units connected to the second conveyor to be movable independently of one another along the second conveyor; each carrier unit being configured to receive and hold the electronic cigarette parts;
   a second group of working stations for assembling and/or inspecting the electronic cigarette parts conveyed along the second conveyor; and the electronic cigarette parts being held by the second group of carrier units;
   and a filling station, disposed between the first conveyor and the second conveyor to receive the electronic cigarette parts at a loading zone from the first conveyor, fill the respective cartridges, and, at an unloading zone, feed the electronic cigarette parts with the respective filled cartridges towards the second conveyor;
   wherein the filling station comprises housings positioned along a circular path and rotatable in a first rotation direction about an axis of the circular path to receive and hold the electronic cigarette parts; and a plurality of filling heads for filling the cartridges of the electronic cigarette parts when disposed at the housings;
   a plurality of support containers configured to be held in the housings of the filling station for supporting the electronic cigarette parts while the cartridges are being filled in the filling station;
   a first pickup device configured, for picking up the electronic cigarette parts from the first group of carrier units as the electronic cigarette parts leave the first conveyor, and for placing the electronic cigarette parts in the support containers;
   a second pickup device, for picking up the electronic cigarette parts from the support containers as the electronic cigarette parts leave the filling station, and placing the electronic cigarette parts at the second group of carrier units as the electronic cigarette parts enter the second conveyor;
   wherein the filling station is configured to receive the electronic cigarette parts, together with the respective support containers, at the loading zone and to release the electronic cigarette parts with respective filled cartridges, together with the respective support containers, at the unloading zone, and
   wherein a first transfer device is arranged at the loading zone, the first transfer device being positioned downstream from the first pickup device, the first transfer device being configured to transfer the electronic cigarette parts, together with the respective support containers, into the housings of the filling station and a second transfer device is arranged at the unloading zone, the second transfer device being positioned upstream from the second pickup device, the second transfer device being configured to disengage the electronic cigarette parts, together with the respective support containers, from the housings of the filling station.

2. The system according to claim 1, further comprising a first weighing station, disposed upstream of the loading zone of the filling station to allow weighing the electronic cigarette parts conveyed by the first conveyor, before the cartridges are filled; and a second weighing a station, disposed downstream of the unloading zone of the filling station to allow weighing the electronic cigarette parts leaving the filling station, after the cartridges have been filled and before transfer to the second conveyor.

3. The system according to claim 1, wherein the filling heads are mounted to a carousel having a circular profile, positioned above the housings and rotatable about an axis of the carousel in the first rotation direction simultaneously with the housings.

4. The system according to claim 1, wherein the filling heads are mounted to a sector that is rotatable about a rotation axis in the first rotation direction while the electronic cigarette parts are being filled, performing a forward stroke, and in a second rotation direction, opposite to the first rotation direction, after the electronic cigarette parts have been filled, performing a backward stroke.

5. The system according to claim 1, wherein the housings are movable translationally in a first translation direction and in a second translation direction, opposite to the first translation direction; wherein the filling heads are movable translationally in the first translation direction and in the second translation direction, simultaneously with the housings.

6. The system according to claim 1, further comprising an auxiliary path connecting the unloading zone with the loading zone of the filling station, on an outside of the filling station; the support containers being conveyed along the auxiliary path after the electronic cigarette parts have been picked up from the support containers.

7. The system according to claim 1, wherein the first conveyor, the filling station and the second conveyor are disposed such that the electronic cigarette parts travel along a C-shaped path passing through the system.

8. The system according to claim 1, wherein at least a part of the plurality of filling heads are movable at least temporarily synchronously with the housings of the filling station to fill the cartridges of the electronic cigarette parts when disposed at the housings.

* * * * *